United States Patent
Greiner et al.

(10) Patent No.: US 8,090,560 B2
(45) Date of Patent: Jan. 3, 2012

(54) SYSTEMS AND METHODS FOR HAUL ROAD MANAGEMENT BASED ON GREENHOUSE GAS EMISSIONS

(75) Inventors: Jonny Ray Greiner, Dunlap, IL (US); Yang Liu, Dunlap, IL (US); Bhavin Jagdishbhal Vyas, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 858 days.

(21) Appl. No.: 12/002,040

(22) Filed: Dec. 14, 2007

(65) Prior Publication Data

US 2009/0154992 A1 Jun. 18, 2009

(51) Int. Cl.
*G06F 17/50* (2006.01)
(52) U.S. Cl. .................... 703/8; 703/1
(58) Field of Classification Search ............... 703/1, 6, 703/7, 8; 705/317
See application file for complete search history.

(56) References Cited

U.S. PATENT DOCUMENTS

| | | | |
|---|---|---|---|
| 5,610,821 A | 3/1997 | Gazis et al. | |
| 5,646,844 A | 7/1997 | Gudat et al. | |
| 5,719,771 A | 2/1998 | Buck et al. | |
| 5,817,936 A | 10/1998 | Schricker | |
| 6,246,932 B1 | 6/2001 | Kageyama et al. | |
| 6,487,478 B1 | 11/2002 | Azzaro et al. | |
| 6,611,755 B1 | 8/2003 | Coffee et al. | |
| 6,622,087 B2 | 9/2003 | Anderson | |
| 6,650,995 B2 | 11/2003 | Bullock | |
| 6,654,684 B2 | 11/2003 | Shinada et al. | |
| 6,865,484 B2 | 3/2005 | Miyasaka et al. | |
| 6,950,740 B1 | 9/2005 | Cook | |
| 6,965,325 B2 | 11/2005 | Finnern | |
| 7,113,127 B1 | 9/2006 | Banet et al. | |
| 7,155,321 B2 | 12/2006 | Bromley et al. | |
| 7,440,871 B2 * | 10/2008 | McConnell et al. | 702/188 |
| 2002/0010569 A1 | 1/2002 | Yamamoto | |
| 2002/0049523 A1 | 4/2002 | Diaz et al. | |
| 2003/0225923 A1 | 12/2003 | Cyr et al. | |
| 2004/0039520 A1 | 2/2004 | Khavakh et al. | |
| 2004/0122580 A1 | 6/2004 | Sorrells | |
| 2005/0171692 A1 | 8/2005 | Hamblen et al. | |

(Continued)

FOREIGN PATENT DOCUMENTS

WO     WO 89/01136 A1     2/1989

OTHER PUBLICATIONS

Chunxia Feng et al., "Data Needs for a Proposed Modal Heavy-Duty Diesel Vehicle Emission Model", 2005, 98th AWMA Meeting, pp. 1-17.*

(Continued)

*Primary Examiner* — Dwin M Craig
(74) *Attorney, Agent, or Firm* — Finnegan, Henderson, Farabow, Garrett & Dunner LLP

(57) ABSTRACT

A method for haul road design based on greenhouse gas emissions comprises receiving a first set of performance data associated with a plurality of machines and establishing a greenhouse gas emission limit for the plurality of machines based on the first set of performance data. A target greenhouse gas emission level for each of the plurality of machines is determined based on the greenhouse gas emission limit, and total effective grade is determined based on the target greenhouse gas emission level for the respective machine. The method also includes generating a haul road design based on the total effective grade.

25 Claims, 5 Drawing Sheets

U.S. PATENT DOCUMENTS

| | | |
|---|---|---|
| 2006/0036363 A1 | 2/2006 | Crook |
| 2006/0047384 A1 | 3/2006 | Robinson et al. |
| 2006/0161335 A1 | 7/2006 | Beinhaker |
| 2007/0016363 A1 | 1/2007 | Huang et al. |
| 2007/0078579 A1 | 4/2007 | Schricker et al. |
| 2007/0156325 A1 | 7/2007 | Livshiz et al. |
| 2007/0233351 A1 | 10/2007 | Wang |
| 2007/0273481 A1 | 11/2007 | Soleimani |
| 2008/0281494 A1 | 11/2008 | Bai |
| 2009/0006734 A1 | 1/2009 | Kishi et al. |

OTHER PUBLICATIONS

Sangjun Park et al., "Energy and Environmental Impacts of Roadway Grades", 2006, Transportation Research Record: Journal of the Transportation Research Board, vol. 1987, pp. 1-21.*

Jonny Ray Greiner et al., Copending U.S. Appl. No. 11/897,651, filed Aug. 31, 2007.

Jonny Ray Greiner et al., Copending U.S. Appl. No. 11/897,736, filed Aug. 31, 2007.

Jonny Ray Greiner et al., Copending U.S. Appl. No. 11/974,240, filed Oct. 12, 2007.

Jonny Ray Greiner et al., Copending U.S. Appl. No. 11/974,371, filed Oct. 12, 2007.

Coutermarsh, B., "Velocity effect of vehicle rolling resistance in sand," Journal of Terramechanics, vol. 44, Apr. 24, 2007, pp. 275-291.

* cited by examiner

SYSTEMS AND METHODS FOR HAUL ROAD MANAGEMENT BASED ON GREENHOUSE GAS EMISSIONS

TECHNICAL FIELD

The present disclosure relates generally to the management and operation of haul roads and, more particularly, to systems and methods for haul road management based on greenhouse gas emissions associated with machines operating in a project environment.

BACKGROUND

Haul road design is an important aspect in the efficiency and productivity of many project environments. Poor haul road design, particularly in project environments that employ heavy machinery, not only results in slow and inefficient performance of the machines operating on the road, but may potentially cause undue stress and strain on machine drive train components, which may be particularly damaging for machines carrying heavy payloads.

Before the widespread use of computers, haul road design was a relatively intensive, manual process that required the expertise of highly-trained engineering professionals and construction personnel to ensure that the design was structurally sound. This design process was not only labor and time-intensive, but was also quite expensive, as many man-hours were required to create the design and verify the conformance of the design with all of the requisite standards and regulations.

After the development of the computer, specialized computer aided design (CAD) software programs provided engineers and construction professionals with tools that aided in the design of haul roads. By leveraging the processing power of the computer, many of these CAD programs were able to perform the complex structural calculations associated with the design within a matter of seconds. Not only did these CAD programs result in significant time savings, they reduced the potential for human error associated with manual calculation techniques, resulting in a more reliable design.

In addition to efficient performance of many processing and calculation functions, these CAD tools also provided an interface that aided in the layout of the haul routes, creation of the haul road blueprints and construction packages, and testing/analyzing of the haul road design prior to construction. While these conventional CAD tools greatly simplified haul road design by providing a solution that performed many of the requisite peripheral functions after the design of the haul road, such as analysis, mapping, and drafting of the design, they were not sophisticated enough to create or develop the haul road design. Thus, in order to reduce reliance on complicated and highly-specialized manual haul road design techniques an interactive software tool for generating a haul road design based on user-defined design parameters may be required.

At least one such interactive road design software tool is described in U.S. Patent Application Publication No. 2002/0010569 ("the '569 publication") to Yamamoto. The '569 publication describes a software-based road design system that receives user-defined design conditions, generates a road design in accordance with the design conditions and any applicable roadway design rules and standards, and outputs a three-dimensional computer-generated rendering of the road design. The software-based road design system may also be networked with a plurality of client systems, allowing a plurality of users to access and operate the design system via the Internet or other shared communication network.

Although some conventional roadway design tools, such as the one described in the '569 publication, may provide a software system for generating a roadway design based on user-defined roadway design parameters, they may have several disadvantages. For example, conventional software design systems may not take into account specific performance parameters of individual machines or groups of machines in the roadway design. Because many types of heavy machines have specific zones of operation where they perform most efficiently, haul roads designed by conventional systems that do not take performance of the machines into account may limit the efficiency and productivity of the machine.

Moreover, many project environments may require haul roads that are designed to meet specific performance objectives. For example, in mine environments where fuel consumption (and/or greenhouse gas emissions) is a concern due to elevated fuel prices and/or emission standards, it may be advantageous to design a haul road that is conducive to minimizing fuel consumption (and/or greenhouse gas emissions) for machines operated on the haul road. However, because many conventional roadway design systems, including the system described in the '569 publication, may not take into account specific performance parameters of individual machines or groups of machines, haul road designers may not be able to determine whether a road design is effective at meeting the desired fuel consumption (and/or greenhouse gas emissions) requirements for a particular group of machines.

The presently disclosed systems and methods for haul road management based on greenhouse gas emissions are directed toward overcoming one or more of the problems set forth above.

SUMMARY

In accordance with one aspect, the present disclosure is directed toward a method for haul road design based on greenhouse gas emissions. The method may comprise receiving a first set of performance data associated with a plurality of machines and establishing a greenhouse gas emission limit for the plurality of machines based on the first set of performance data. A target greenhouse gas emission level for each machine may be determined based on the greenhouse gas emission limit and total effective grade for each machine may be determined based on the target greenhouse gas emission level for the respective machine. The method may also include generating a haul road design based on the total effective grade.

According to another aspect, the present disclosure is directed toward a method for haul road management based on greenhouse gas emissions. The method may comprise receiving performance data associated with at least one machine operating on a haul road and determining a greenhouse gas emission level associated with the at least one machine based on the performance data. The greenhouse gas emission level associated with the at least one machine may be compared with a greenhouse gas emission limit. Performance of the at least one machine may be simulated over a plurality of total effective grade values if the greenhouse gas emission level is greater than the greenhouse gas emission limit. A total effective grade value associated with the at least one machine may be selected based on the simulated performance, and at least one haul road management parameter may be adjusted based on the selected total effective grade value.

DETAILED DESCRIPTION

Figure 1:
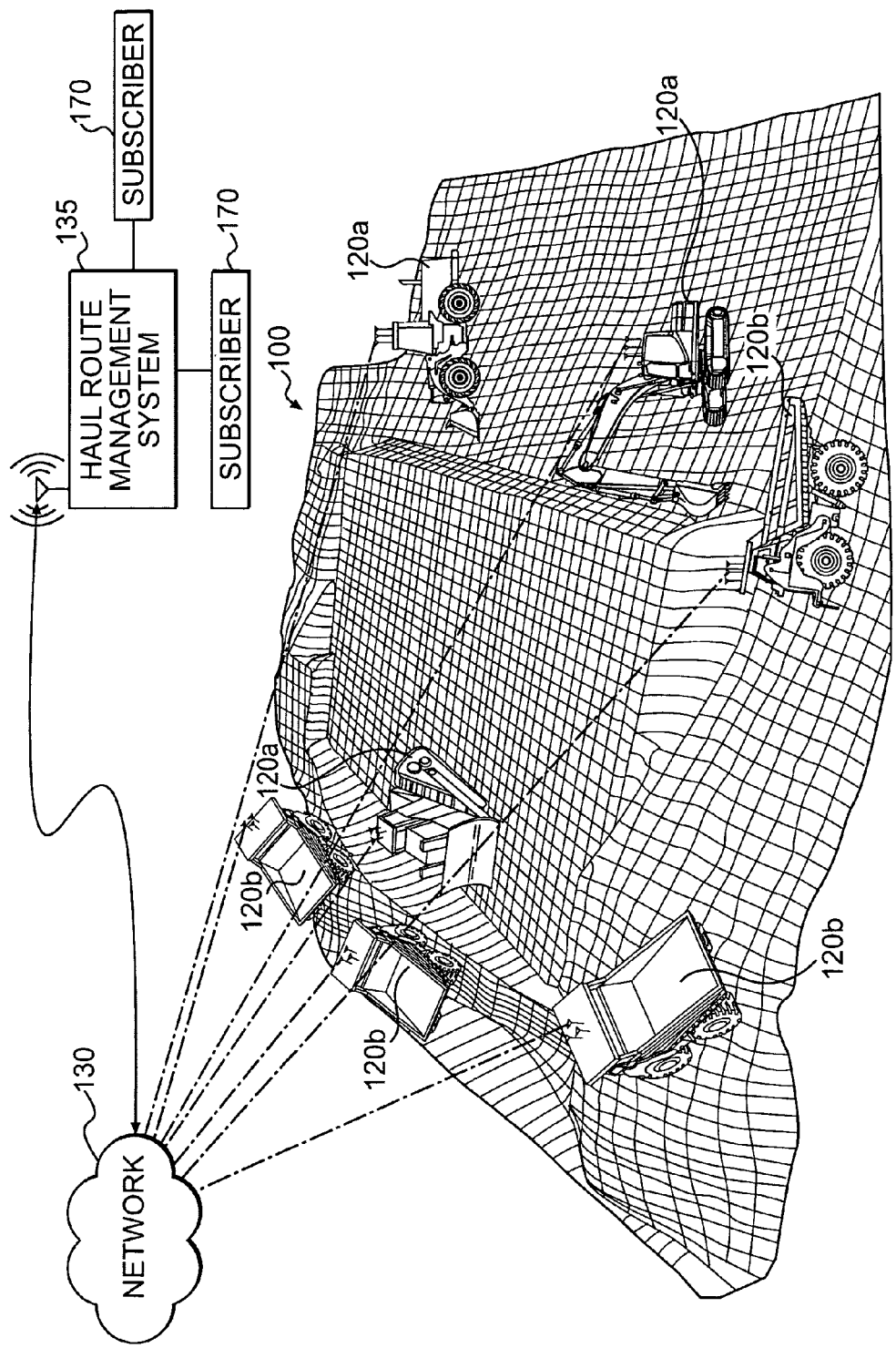
FIG. 1 illustrates an exemplary project environment consistent with the disclosed embodiments.

FIG. 1 illustrates an exemplary project environment 100 consistent with the disclosed embodiments. Project environment 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, project environment 100 may include a mining environment that comprises one or more machines 120a, 120b coupled to a haul road management system 135 via a communication network 130. Project environment 100 may be configured to monitor, collect, and filter information associated with the status, health, and performance of one or more machines 120a, 120b, and distribute the information to one or more back-end systems or entities, such as haul road management system 135 and/or subscribers 170. It is contemplated that additional and/or different components than those listed above may be included in project environment 100.

As illustrated in FIG. 1, machines 120a, 120b may include one or more excavators 120a and one or more transport machines 120b. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, dozers, etc. Transport machines 120b may embody any machine that is configured to transport materials within project environment 100 such as, for example, articulated trucks, dump trucks, or any other truck adapted to transport materials. The number, sizes, and types of machines illustrated in FIG. 1 are exemplary only and not intended to be limiting. Accordingly, it is contemplated that project environment 100 may include additional, fewer, and/or different components than those listed above. For example, project environment 100 may include a skid-steer loader, a track-type tractor, material transfer vehicle, or any other suitable fixed or mobile machine that may contribute to the operation of project environment 100.

Figure 2:
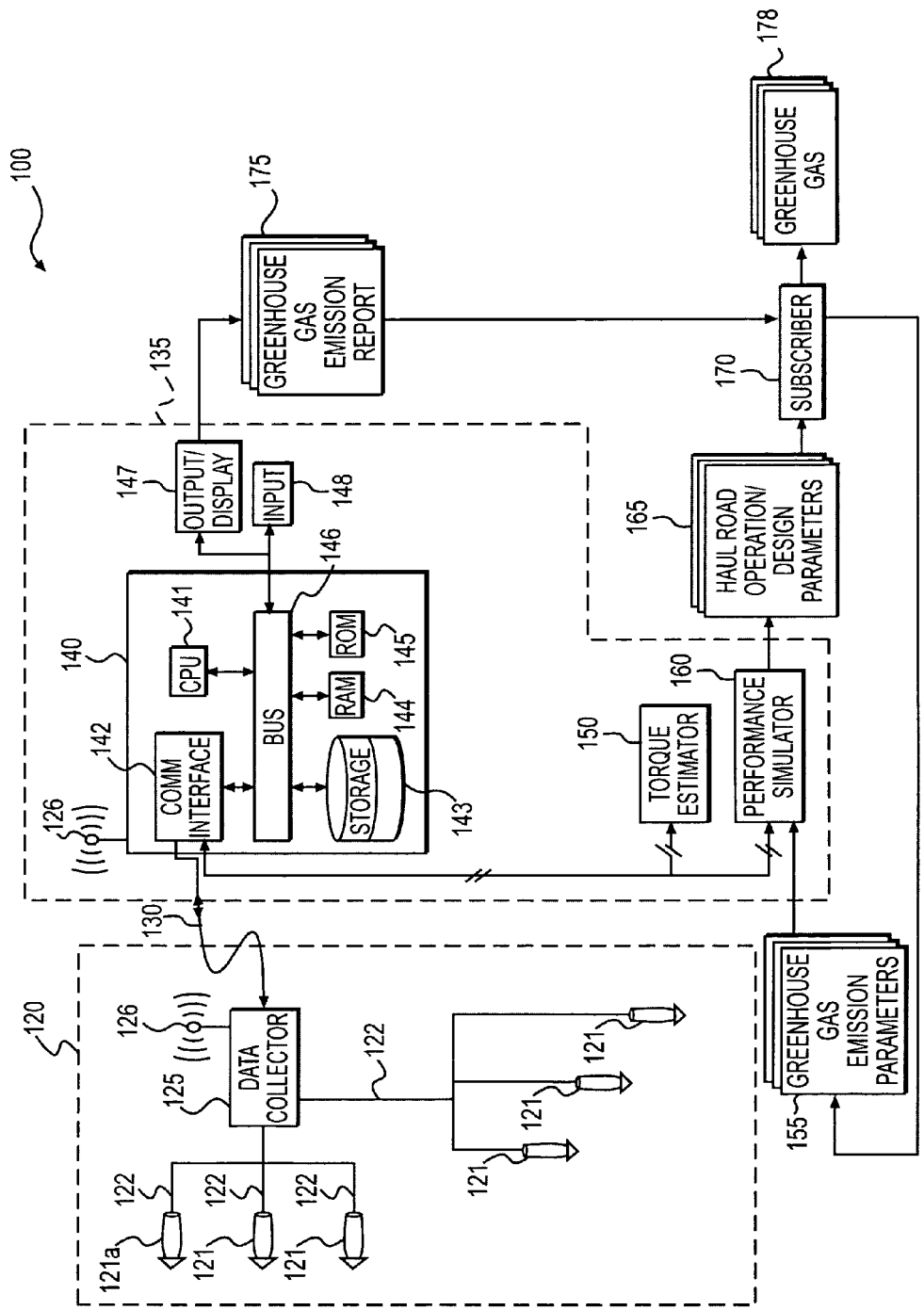
FIG. 2 provides a schematic diagram illustrating certain components associated with the project environment of FIG. 1.

In one embodiment, each of machines 120a, 120b may include on-board data collection and communication equipment to monitor, collect, and/or distribute information associated with one or more components of machines 120a, 120b. As shown in FIG. 2, machines 120a, 120b may each include, among other things, one or more monitoring devices 121, such as sensors or electronic control modules coupled to one or more data collectors 125 via communication lines 122; one or more transceiver devices 126; and/or any other components for monitoring, collecting, and communicating information associated with the operation of machines 120a, 120b. Each of machines 120a, 120b may also be configured to receive information, warning signals, operator instructions, or other messages or commands from off-board systems, such as a haul road management system 135. The components described above are exemplary and not intended to be limiting. Accordingly, the disclosed embodiments contemplate each of machines 120a, 120b including additional and/or different components than those listed above.

Monitoring devices 121 may include any device for collecting performance data associated with one or more machines 120a, 120b. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of machines 120a, 120b.

In one embodiment, transport machines 120b may each include at least one torque sensor 121a for monitoring a torque applied to the drive axle. Alternatively, torque sensor 121a may be configured to monitor a parameter from which torque on the drive axle may be calculated or derived. It is contemplated that one or more monitoring devices 121 may be configured to monitor certain environmental features associated with project environment 100. For example, one or more machines 120a, 120b may include an inclinometer for measuring an actual grade associated with a surface upon which the machine is traveling. It is also contemplated that one or more monitoring devices 121 may be dedicated to the collection of machine location data. For example, machines 120a, 120b may each include GPS equipment for monitoring location data (e.g., latitude, longitude, elevation, etc.) associated with the machine.

Data collector 125 may be configured to receive, collect, package, and/or distribute performance data collected by monitoring devices 121. Performance data, as the term is used herein, refers to any type of data indicative of at least one operational aspect associated with one or more machines 120 or any of its constituent components or subsystems. Non-limiting examples of performance data may include, for example, health information such as fuel level, oil pressure, engine temperature, coolant flow rate, coolant temperature, tire pressure, or any other data indicative of the health of one or more components or subsystems of machines 120a, 120b. Alternatively and/or additionally, performance data may include status information such as engine power status (e.g., engine running, idle, off), engine hours, engine speed, machine groundspeed, machine location and elevation, current gear that the machine is operating in, or any other data indicative of a status of machine 120. Optionally, performance data may also include certain productivity information such as task progress information, load vs. capacity ratio, shift duration, haul statistics (weight, payload, etc.), fuel efficiency, or any other data indicative of a productivity of machine 120. Alternatively and/or additionally, performance data may include control signals for controlling one or more aspects or components of machines 120*a*, 120*b*. Data collector 125 may receive performance data from one or more monitoring devices via communication lines 122 during operations of the machine.

According to one embodiment, data collector 125 may automatically transmit the received data to haul road management system 135 via communication network 130. Alternatively or additionally, data collector 125 may store the received data in memory for a predetermined time period, for later transmission to haul road management system 135. For example, if a communication channel between the machine and haul road management system 135 becomes temporarily unavailable, the performance data may be retrieved for subsequent transmission when the communication channel has been restored.

Communication network 130 may include any network that provides two-way communication between machines 120*a*, 120*b* and an off-board system, such as haul road management system 135. For example, communication network 130 may communicatively couple machines 120*a*, 120*b* to haul road management system 135 across a wireless networking platform such as, for example, a satellite communication system. Alternatively and/or additionally, communication network 130 may include one or more broadband communication platforms appropriate for communicatively coupling one or more machines 120*a*, 120*b* to haul road management system 135 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a satellite wireless communication network, it is contemplated that communication network 130 may include wireline networks such as, for example, Ethernet, fiber optic, waveguide, or any other type of wired communication network.

Haul road management system 135 may include one or more hardware components and/or software applications that cooperate to improve performance of a haul route by monitoring, analyzing, optimizing, and/or controlling performance or operation of one or more individual machines. Haul road management system 135 may include a condition monitoring system 140 for collecting, distributing, analyzing, and/or otherwise managing performance data collected from machines 120*a*, 120*b*. Haul road management system 135 may also include a torque estimator 150 for determining a drive axle torque, estimating a total effective grade, calculating a rolling resistance, and/or determining other appropriate characteristics that may be indicative of the performance of a machine or machine drive train. Haul road management system 135 may also include a performance simulator 160 for simulating performance-based models of machines operating within project environment 100 and adjusting operating parameters of machines 120*a*, 120*b* and/or physical features of the haul route to improve project environment productivity.

Condition monitoring system 140 may include any computing system configured to receive, analyze, transmit, and/or distribute performance data associated with machines 120*a*, 120*b*. Condition monitoring system 140 may be communicatively coupled to one or more machines 120 via communication network 130. Condition monitoring system 140 may embody a centralized server and/or database adapted to collect and disseminate performance data associated with each of machines 120*a*, 120*b*. Once collected, condition monitoring system 140 may categorize and/or filter the performance data according to data type, priority, etc. In the case of critical or high-priority data, condition monitoring system 140 may be configured to transmit "emergency" or "critical" messages to one or more work site personnel (e.g., repair technician, project managers, etc.) identifying machines that have experienced a critical event. For example, should a machine become disabled, enter an unauthorized work area, or experience a critical engine operation condition, condition monitoring system 140 may transmit a message (text message, email, page, etc.) to a project manager, job-site foreman, shift manager, machine operator, and/or repair technician, indicating a potential problem with the machine.

Condition monitoring system 140 may include hardware and/or software components that perform processes consistent with certain disclosed embodiments. For example, as illustrated in FIG. 2, condition monitoring system 140 may include one or more transceiver devices 126; a central processing unit (CPU) 141; a communication interface 142; one or more computer-readable memory devices, including storage device 143, a random access memory (RAM) module 144, and a read-only memory (ROM) module 145; a display unit 147; and/or an input device 148. The components described above are exemplary and not intended to be limiting. It is contemplated that condition monitoring system 140 may include alternative and/or additional components than those listed above.

CPU 141 may be one or more processors that execute instructions and process data to perform one or more processes consistent with certain disclosed embodiments. For instance, CPU 141 may execute software that enables condition monitoring system 140 to request and/or receive performance data from data collector 125 of machines 120*a*, 120*b*. CPU 141 may also execute software that stores collected performance data in storage device 143. In addition, CPU 141 may execute software that enables condition monitoring system 140 to analyze performance data collected from one or more machines 120*a*, 120*b*, perform diagnostic and/or prognostic analysis to identify potential problems with the machine, notify a machine operator or subscriber 170 of any potential problems, and/or provide customized operation analysis reports, including recommendations for improving machine performance.

CPU 141 may be connected to a common information bus 146 that may be configured to provide a communication medium between one or more components associated with condition monitoring system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for two-way data communication between condition monitoring system 140 and remote systems (e.g., machines 120*a*, 120*b*) via transceiver device 126. For example, communication interface 142 may include one or more modulators, demodulators, multiplexers, demultiplexers, network communication devices, wireless devices, antennas, modems, or any other devices configured to support a two-way communication interface between condition monitoring system 140 and remote systems or components.

One or more computer-readable medium devices may include storage devices 143, a RAM 144, ROM 145, and/or any other magnetic, electronic, flash, or optical data computer-readable medium devices configured to store information, instructions, and/or program code used by CPU 141 of condition monitoring system 140. Storage devices 143 may include magnetic hard-drives, optical disc drives, floppy drives, flash drives, or any other such information-storing device. A random access memory (RAM) device 144 may include any dynamic storage device for storing information and instructions by CPU 141. RAM 144 may store temporary variables or other intermediate information during execution of instructions to be executed by CPU 141. During operation, some or all portions of an operating system (not shown) may be loaded into RAM 144. In addition, a read only memory (ROM) module 145 may include any static storage device for storing information and instructions by CPU 141.

Condition monitoring system 140 may be configured to analyze performance data associated with each of machines 120a, 120b. According to one embodiment, condition monitoring system 140 may include diagnostic software for analyzing performance data associated with one or more machines 120a, 120b based on threshold levels (which may be factory set, manufacturer recommended, and/or user configured) associated with a respective machine. For example, diagnostic software associated with condition monitoring system 140 may compare an engine temperature measurement received from a particular machine with a predetermined threshold engine temperature. If the measured engine temperature exceeds the threshold temperature, condition monitoring system 140 may generate an alarm and notify one or more of the machine operator, job-site manager, repair technician, dispatcher, or any other appropriate person or entity.

In accordance with another embodiment, condition monitoring system 140 may be configured to monitor and analyze productivity associated with one or more of machines 120a, 120b. For example, condition monitoring system 140 may include productivity software for analyzing performance data associated with one or more machines 120a, 120b based on user-defined productivity thresholds associated with a respective machine. Productivity software may be configured to monitor the productivity level associated with each of machines 120a, 120b and generate a productivity report for a project manager, a machine operator, a repair technician, or any other entity that may subscribe to operator or machine productivity data (e.g., a human resources department, an operator training and certification division, etc.) According to one exemplary embodiment, productivity software may compare a productivity level associated with a machine (e.g., amount of material moved by a particular machine) with a predetermined productivity quota established for the respective machine. If the productivity level is less than the predetermined quota, a productivity notification may be generated and provided to the machine operator and/or project manager, indicating the productivity deficiency of the machine.

Condition monitoring system 140 may be in data communication with one or more other back-end systems and may be configured to distribute certain performance data to these systems for further analysis. For example, condition monitoring system 140 may be communicatively coupled to a torque estimator 150 and may be configured to provide performance data associated with the machine drive axle to torque estimator 150. Alternatively or additionally, condition monitoring system 140 may be in data communication with a performance simulator 160 and may be configured to provide performance data to performance simulator 160 for further analysis. Although torque estimator 150 and performance simulator 160 are illustrated as standalone systems that are external to condition monitoring system 140, it is contemplated that one or both of torque estimator 150 and performance simulator 160 may be included as a subsystem of condition monitoring system 140.

Torque estimator 150 may include a hardware or software module configured to receive/collect certain performance data from condition monitoring system 140 and determine, based on the received performance data, a drive axle torque associated with one or more machines 120a, 120b. Torque estimator 150 may be configured to determine a drive axle torque based on performance data collected by torque sensor 121a. Alternatively or additionally, drive axle torque may be estimated based on the performance data and the known design parameters of the machine. For example, based on an engine operating speed and the operating gear, torque estimator 150 may access an electronic look-up table and estimate the drive axle torque of the machine at a particular payload weight using the look-up table.

Once an estimated machine drive axle torque is determined, torque estimator 150 may estimate a total effective grade for the one or more machines. For example, torque estimator 150 may estimate a total effective grade (TEG) value as:

$$TEG = \frac{RP}{GMW} - \frac{MA}{AG} \qquad \text{(Equation 1)}$$

where RP refers to machine rim pull, GMW refers to gross machine weight, MA refers to the acceleration of the machine, and AG refers to the actual grade of the terrain on which that machine is located. Gross machine weight and machine acceleration may be monitored using on-board data monitoring devices 121. Actual grade may be estimated based on monitored GPS data associated with the machine. For example, actual grade may be determined using based on latitude, longitude, and elevation of the machine derived from precision GPS data gathered from on-board GPS equipment. According to one embodiment, actual grade may be determined by calculating ratio between the vertical change in position (based on the elevation data associated with the GPS data) and the horizontal change in position (based on the latitude and longitude data associated with the GPS data). Alternatively or additionally, actual grade may be calculated using an on-board data monitoring device such as, for example, an inclinometer. Rim pull may be determined as:

$$RP = \frac{DAT \times LPTR \times PTE}{TDRR} \qquad \text{(Equation 2)}$$

where DAT refers to the torque applied to the machine drive axle, LPTR refers to the lower power train reduction factor, PTE refers to the efficiency of the power train, and TDRR refers to the dynamic rolling radius of the tire. Lower power train reduction may be determined by monitoring a change in gear during real-time calculation of rim pull. Power train efficiency may be calculated based on real-time performance data collected from the machine. Tire dynamic rolling radius may be estimated based on a monitored tire pressure, speed, and gross machine weight.

Once total effective grade has been determined, torque estimator 150 may determine a rolling resistance associated with one or more of machines 120a, 120b. A rolling resistance value may be calculated as:

$$RR = TEG - (AG + EL) \qquad \text{(Equation 3)}$$

where EL refers to the efficiency loss of the machine. Efficiency loss may be estimated as the difference between input power efficiency and output power efficiency, which may be estimated based on empirical test data at particular engine operating speeds and loading conditions. As explained, actual grade may be determined based on calculations associated with collected GPS data and/or monitored using an on-board inclinometer.

Performance simulator 160 may be configured to simulate performance of machines 120a, 120b under various operational or environmental conditions. Based on the simulated performance results, performance simulator 160 may determine one or more machine operating conditions (e.g., speed, gear selection, engine RPM, payload level or limit, etc.) and/or haul road parameters (e.g., actual grade, rolling resistance, surface density, surface friction, etc.) to achieve a desired performance of machines 120a, 120b and/or project environment 100.

Performance simulator 160 may be any type of computing system that includes software for simulating a machines and/or components associated therewith. The simulating software may be configured to build an analytical model corresponding to a machine or any of its constituent components based on empirical data collected from real-time operations of the machine. Once the model is built, performance simulator 160 may analyze the model under specific operating conditions (e.g., load conditions, environmental conditions, terrain conditions, haul route design conditions, etc.) and generate simulated performance data of the machine based on the specified conditions.

According to one embodiment, performance simulator 160 may include ideal design models associated with each of machines 120a, 120b. These ideal models can be electronically simulated to generate ideal performance data (i.e., data based on the performance of the machine as designed (under ideal operating conditions)). Those skilled in the art will recognize that, as a machine ages, components associated with the machine may begin to exhibit non-ideal behavior, due to normal wear and tear, stress, and/or damage to the machine during operation. In order to provide more realistic performance simulations consistent with these non-idealities, the ideal models may be edited and/or supplemented based on actual performance data collected from machines 120a, 120b, thus creating actual or empirical models of a respective machine and/or its individual components.

Performance simulator 160 may also include actual performance-based models associated with each of the machines 120a, 120b. Similar to the ideal design models described above, these performance-based models may be electronically simulated to predict performance and productivity of the machine under a variety of actual operating conditions. However, in contrast with the ideal models described above, performance simulator may be configured to generate the performance-based models based on specific operating conditions unique to each machine. Performance simulator 160 may simulate an actual model of hauler 120b under a variety of machine operating conditions to determine a speed, torque output, engine condition, fuel consumption rate, haul route completion time, etc. associated with each simulated condition. Alternatively or additionally, performance simulator 160 may be configured to simulate the actual model of hauler 120b under a variety of physical conditions (e.g., grade levels, friction levels, smoothness, density, hardness, moisture content, etc.) associated with the haul road surface to identify haul road parameters that cause the one or more machines to operate within a desired threshold operating range. As such, performance simulator 160 may provide mine operators and haul road designers a solution for customizing a haul road design based on actual performance data associated with one or more machines to be operated thereon.

Performance simulator 160 may be configured to receive greenhouse gas emission parameters 155 associated with one or more individual machines or groups of machines operating in a project environment 100. According to one embodiment, greenhouse gas emission parameters 155 may include a target greenhouse gas emission level for one or more of the machines and/or a target greenhouse gas emission level corresponding with project environment 100. Alternatively and/or additionally, greenhouse gas emission parameters 155 may include a target fuel consumption rate for effectuating a reduction in greenhouse gas emissions.

Performance simulator 160 may be configured to allow users to simulate the ideal and/or performance-based software models corresponding with one or more machines under a variety of haul road design conditions. For example, using a software model associated with a hauler, performance simulator 160 may simulate operation of the hauler at multiple haul road grades by varying the total effective grade and/or rolling resistance that is presented to the hauler. Using the equations above, performance simulator may determine an actual grade for a proposed haul road design corresponding to each total effective grade and/or rolling resistance value presented to the hauler and identify trends in machine performance based on road grades associated with one or more haul road designs. Subscribers 170 may select an actual grade for a haul road design by identifying the percent grade at which the simulated performance of the machine exhibits desired performance characteristics. For example, in mine environments where minimizing fuel consumption is a priority, performance simulator 160 may identify the haul road grade that causes the machine to consume the least amount of fuel. Alternatively and/or additionally, in mine environments where limiting greenhouse gas emissions, performance simulator 160 may identify the haul road grade that generates the least amount of greenhouse gas emissions in a majority of the machines.

In addition to haul road grade, performance simulator 160 may also be adapted to simulate operation of the hauler under other haul road conditions. For example, total effective grade and/or rolling resistance may be affected by tire and/or transmission slip, which may each depend upon haul road surface density, moisture level, and friction. Accordingly, performance simulator 160 may simulate performance of one or more machines by varying the total effective grade and/or rolling resistance levels presented to the machine to identify a desired greenhouse gas emission level and/or fuel consumption rate of the machine.

Once a desired machine performance and total effective grade value associated with the desired performance have been identified, performance simulator 160 may generate one or more haul road operation/design parameters that comply with the desired machine performance and/or total effective grade. For example, performance simulator 160 may specify a particular haul road surface density, friction, and maximum allowable moisture level for a haul road grade that cause the machine to meet a target greenhouse gas emission limit for the machine. These parameters may be adjusted until a desired greenhouse gas emission level has been identified. Thus, as the grade level increases, thereby increasing the possibility of tire and/or transmission slip that may lead to an increase in fuel consumption and greenhouse gas emission level, the haul road surface density, friction, and maximum allowable moisture level (i.e., drainage rate) may be adjusted to compensate for increased emission associated with the grade level increase.

Performance simulator 160 may be configured to determine cost/benefit relationships between different haul road designs. For instance, increasing haul road grade may decrease the required length of the haul road, potentially reducing haul road construction and maintenance costs. Increasing the grade of the haul road, however, may result in increased fuel consumption and, therefore, an increase in greenhouse gas emission level. In some jurisdictions, fines imposed for exceeding greenhouse gas emission limits may far exceed the savings in haul road construction and maintenance costs. Furthermore, because tire and/or transmission slip may be more prevalent on steeper grades, savings in haul road construction costs as a result of the decreased length of the haul road may be offset by increases in costs associated with haul road adjustments aimed at reducing slip (e.g., by increasing haul road surface density, increasing haul road drainage to limit excess moisture in the soil, etc.) Performance simulator 160 may compile potential costs/benefits associated with each different haul road design.

Performance simulator 160 may also include a diagnostic and/or prognostic simulation tool that simulates actual machine models (i.e., models derived or created from actual machine data) to predict a component failure and/or estimate the remaining lifespan of a particular component or subsystem of the machine. For example, based on performance data associated with the engine and/or transmission, performance simulator 160 may predict the fuel consumption rate and greenhouse gas emission level for each machine. Accordingly, performance simulator 160 may predict how changes in one or more haul road parameters may affect the fuel consumption rate and/or greenhouse gas emission level. For instance, performance simulator 160 may estimate that, if the grade of a particular haul road segment is reduced by 1.5%, thereby allowing the engine to operate at a more efficient engine speed, the greenhouse gas emission level for a respective machine and/or project environment 100 may be reduced by 15%. Performance simulator 160 may periodically report this data to a mine operator, project manager, machine operator, and/or environmental compliance department of project environment 100.

According to one exemplary embodiment, one or more of condition monitoring system 140 and/or performance simulator 160 may be configured to monitor trends in performance data associated with portions of the haul route. For example, performance simulator 160 may be configured to monitor real-time greenhouse gas emission and fuel consumption statistics associated with one or more machines operating on a haul route. Using precision GPS data, performance simulator 160 may associate the real-time data with a particular position of the machine when the data was collected. Performance simulator 160 may be configured to identify trends in the monitored fuel consumption and greenhouse gas emission data and correlate these trends over a particular portion of the haul route in order to identify potential problems with the haul route that may unnecessarily increase the fuel consumption rates and/or greenhouse gas emission levels.

According to another example, performance simulator 160 may be configured to detect performance deficiencies associated with one or more machines 120a, 120b due to haul road conditions by determining when machines 120a, 120b perform an excessive number of gear changes during haul route operations. Because excessive gear changes may be indicative of an inefficiency in the operation of a machine engine and, therefore, may lead to increased fuel consumption and greenhouse gas emission, it may be advantageous to identify portions of the haul road that cause machines to perform an excessive number of gear changes. Consequently, haul road parameters may be adjusted to smooth the haul road and prevent an excessive number of gear changes.

For example, performance simulator 160 may be configured to monitor and record the number of gear changes (e.g., downshifts, upshifts, etc.) associated with one or more machines 120a, 120b corresponding with particular portions of the haul route. Performance simulator 160 may be configured to calculate an average number of gear changes associated with one or more haul route segments. Performance simulator 160 may identify segments of the haul route having an average number of gear changes that exceeds a threshold acceptable level, for further performance simulation and/or analysis.

Performance simulator 160 may be configured to output results of the performance simulation(s) and/or haul road design data. For example, performance simulator 160 may output performance simulation results and/or haul road design data via display 147 associated with condition monitoring system 140. Alternatively and/or additionally, performance simulator 160 may generate haul road operation/design parameters 165 to limit the greenhouse gas emissions associated with machine operating in project environment 100. Haul road operation/design parameters 165 may include performance simulation results corresponding to the different total effective grade levels and/or rolling resistance values used during the simulations and respective greenhouse gas emission levels associated with each simulated total effective grade value. Haul road operation/design parameters 165 may also include any cost/benefit data for each haul road design compiled by performance simulator 160. The cost/benefit data may be based on historic or data gathered from previous haul road design projects. Performance simulator 160 may be configured to distribute haul road operation/design parameters 165 to one or more subscribers 170. Based on the greenhouse gas emission summary 175, subscribers 170 (and or one or more computer system or software programs associated therewith) may determine an amount of greenhouse gas credits generated by project environment 100. Accordingly, subscribers 170 may prepare one or more applications for validating any greenhouse gas credits generated by project environment 100 and, if approved, generate greenhouse gas credit certificates for sale, transfer, and/or redemption in exchange for reduction of carbon emission deficits at other worksites.

In addition to haul road operation/design parameters 165, haul road management system 135 may be configured to generate a greenhouse gas emission report 175, indicative of current greenhouse gas emission and/or fuel consumption statistics associated with one or more individual machines and/or project environment 100. As illustrated in FIG. 2, haul road management system 135 may be configured to provide greenhouse gas emission report 175 as a standalone report and/or as a part of haul road operation/design parameters 165). According to one exemplary embodiment, condition monitoring system 140 may be configured to generate greenhouse gas emission report 175 as part of a diagnostic test performed for each machine.

Performance simulator 160 may provide haul road design summary 165 to one or more designated subscribers 170 of haul route design data. Subscribers 170 may include, for example, haul road customers such as project managers, mine owners, or any other person or entity that may be designated to receive haul road design summary 165.

It is contemplated that one or more of condition monitoring system 140, torque estimator 150, and/or performance simulator 160 may be included as a single, integrated software package or hardware system. Alternatively or additionally, these systems may embody separate standalone modules configured to interact or cooperate to facilitate operation of one or more of the other systems. For example, while torque estimator 150 is illustrated and described as a standalone system, separate from performance simulator 160, it is contemplated that torque estimator 150 may be included as a software module configured to operate on the same computer system as performance simulator 160.

Figure 3A:
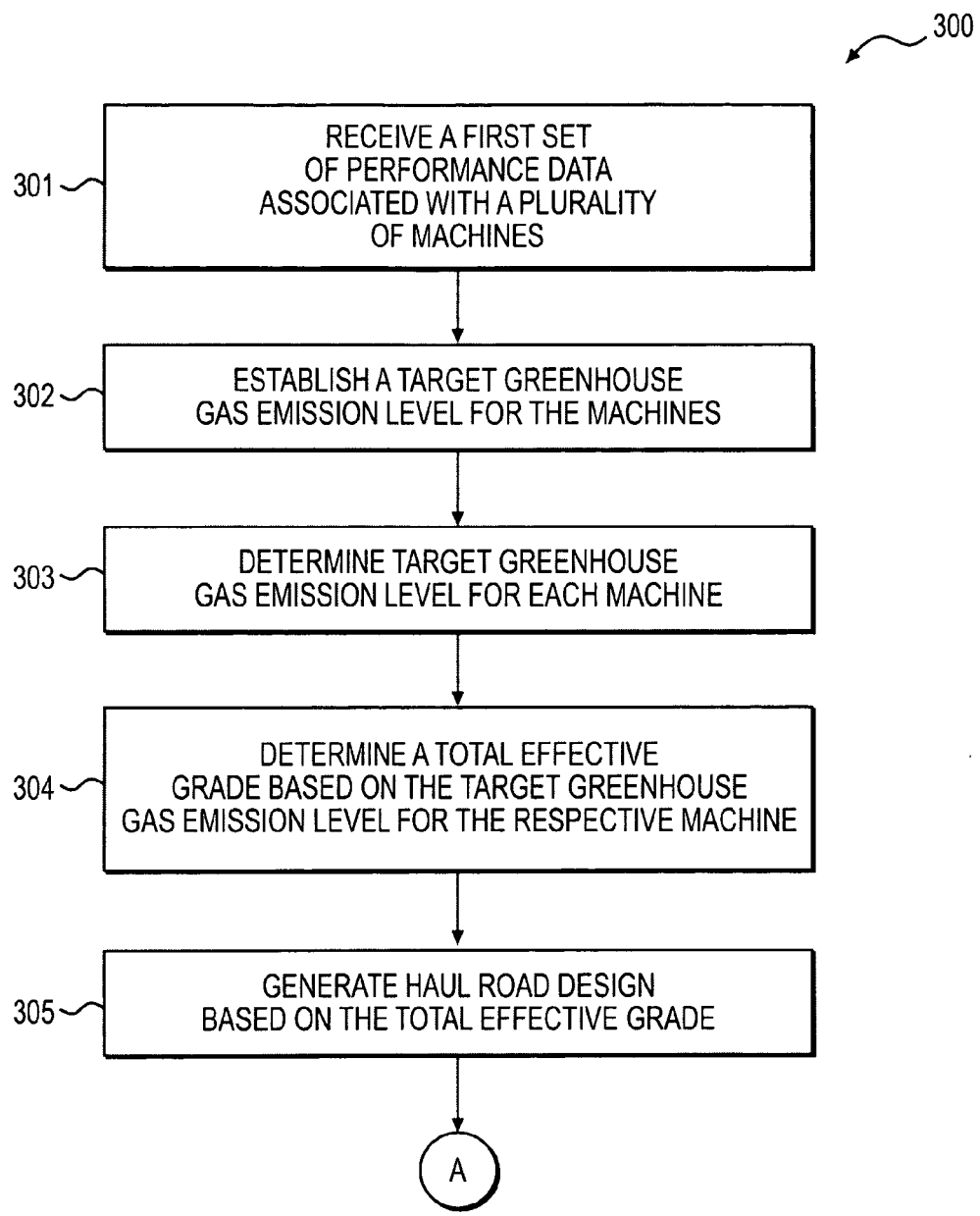
FIGS. 3A and 3B provide a flowchart depicting an exemplary method for designing a haul road based on target greenhouse gas emissions levels associated with one or more machines to be operated on the haul road, consistent with certain disclosed embodiments.
Figure 3B:
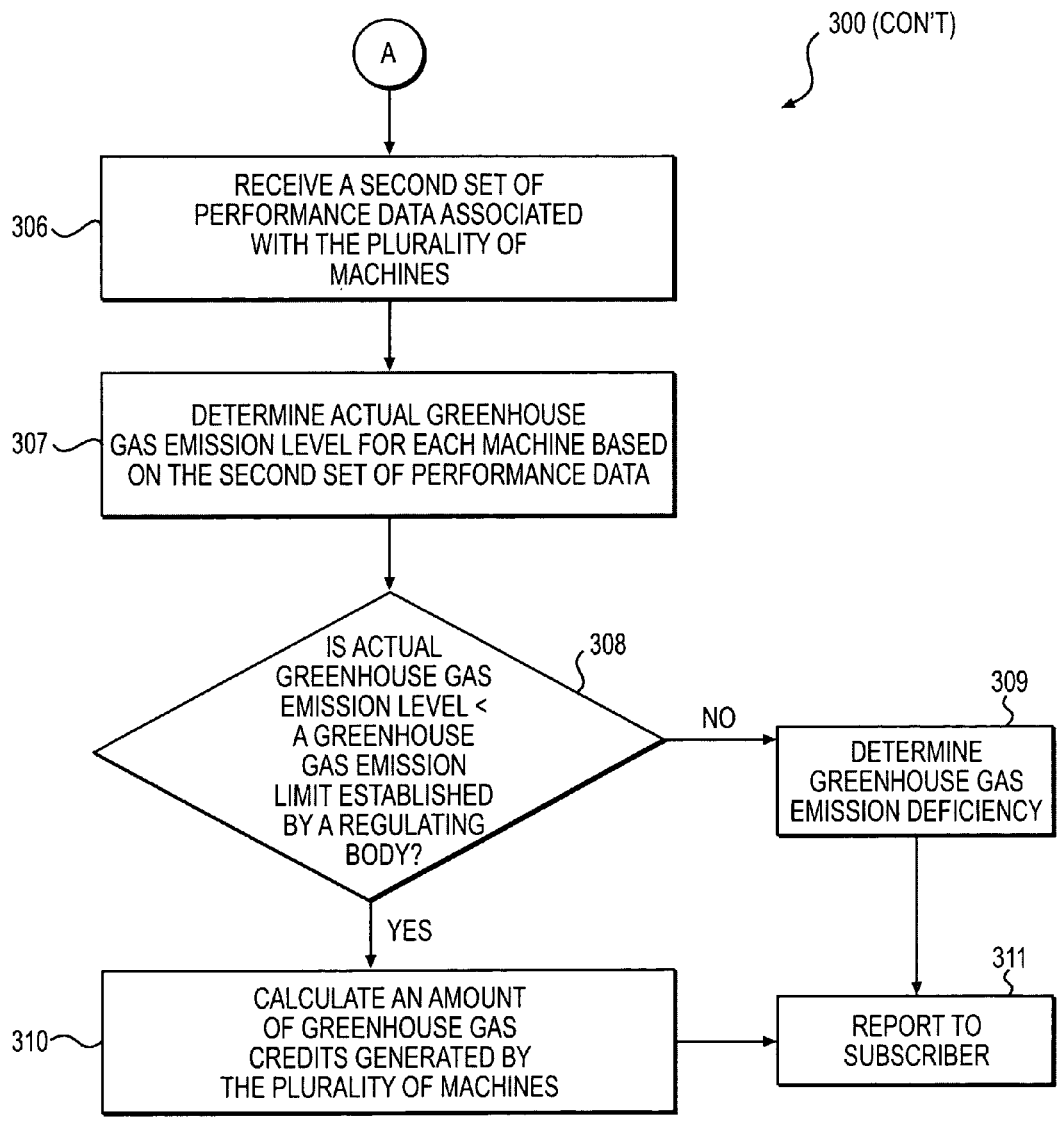
Figure 4:
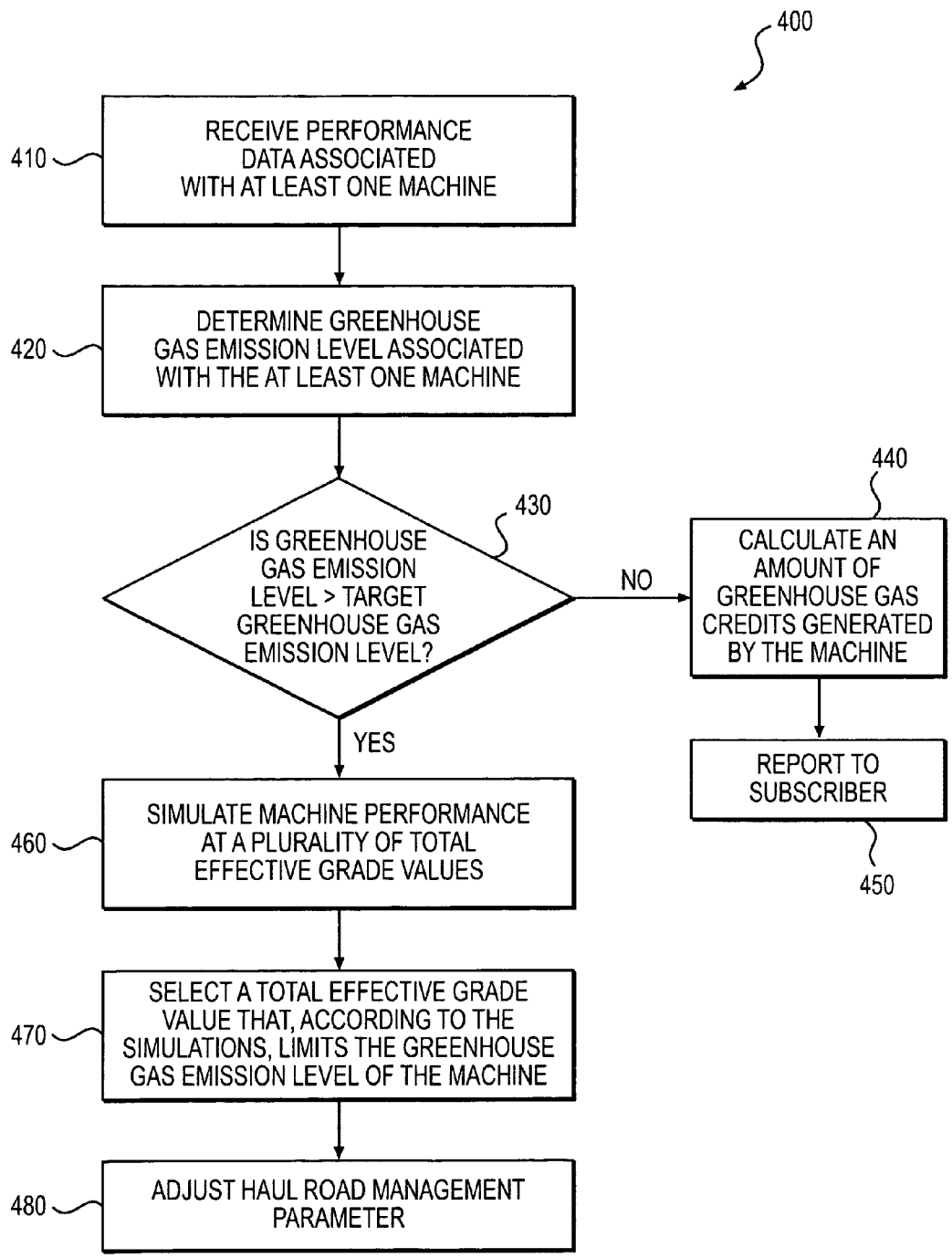
FIG. 4 provides a flowchart depicting an exemplary embodiment for managing a haul road grade based on greenhouse gas emission data collected from one or more machines to be operated on the haul road, consistent with certain disclosed embodiments.

Processes and methods consistent with the disclosed embodiments may provide an interactive solution that leverages data collection capabilities of a connected worksite with machine performance simulation software to design and/or manage a haul road based on greenhouse gas emission levels and/or fuel consumption rates associated with one or more machines operating on the haul road. The presently disclosed systems and method for haul road management based on greenhouse gas emissions may allow mine operators to customize a haul road design, manage machine operations, or detect and maintain flaws in existing haul roads based on a target greenhouse gas emission level associated with one or more machines or groups of machines operating in project environment 100. As a result, mine operators that employ the systems and methods described herein may customize haul road designs and operations to more effectively meet target greenhouse gas reduction goals and/or fuel consumption limits. FIGS. 3A and 3B illustrate flowchart 300 depicting an exemplary method for haul road design to conform to a target greenhouse gas reduction goal. Similarly, FIG. 4 illustrates a flowchart 400 depicting an exemplary method for managing haul road and/or machine operating parameters to meet a target greenhouse gas level.

As explained, the presently disclosed processes may provide a solution for designing a haul road based on a target greenhouse gas limit established by a customer (e.g., project manager, mine owner or operator, etc.). As illustrated in FIG. 3, the haul road design process may include receiving a first set of performance data associated with a plurality of machines to be operated on a haul road (Step 301). The first set of data may include performance data associated with individual machines to be operated on the haul road. This performance data may include, for example, historical data collected during previous operations of the machines. This data may be uploaded onto haul road management system 135 by a customer or retrieved from storage 143 associated with condition monitoring system 140. As an alternative or in addition to actual operation data of each machine to be operated on the haul route, the first set of performance data may include performance data generated by software data models associated with each machine.

In order to evaluate the performance of project environment 100 and/or one or more machines associated therewith, target greenhouse gas emission levels for one or more machines or groups of machines may be established (Step 302). For example, a project manager, mine owner, or mine operator may establish a target greenhouse gas emission level for a project environment that encompasses a mine site. The target greenhouse gas emission level may include, for example, a target threshold level established to limit emission of certain greenhouse gas pollutants into the environment. These limits may be established based on limitations imposed by a governmental entity, environmental organization, and/or other regulating body. Alternatively, such limitations may be established voluntarily by the mine owner or operator.

Once a target greenhouse gas emission level for a group of machines has been established, a greenhouse gas emission level for each machine may be calculated (Step 303). For example, once a target greenhouse gas emission level has been established for a worksite containing 50 machines, a target greenhouse gas emission level for each machine may be determined. According to one embodiment, target levels for each machine may be calculated as the total greenhouse gas emission level for the group of machines divided by the number of machines in the group. However, certain groups may contain different types of machines, each type of machine configured to perform a different task and, therefore, having a fuel consumption requirement and, therefore, a different greenhouse gas emission level. Accordingly, a target level for a particular machine may be based on the type of machine and/or operations associated with the machine.

Once a target greenhouse gas emission level has been established for each individual machine, a fuel consumption level and total effective grade for each machine may be determined (Step 304). For example, based on the target greenhouse gas emission level for the machine, performance simulator 160 may simulate the performance of each machine to determine a target total effective grade for the machine that will result in the machine meeting its target greenhouse gas emission level.

Once total effective grade values have been determined for each machine, a haul road design for the project environment may be generated based on the total effective grade (Step 305). For example, performance simulator 160 may include haul road design software that receives a plurality of performance definitions from a haul road designer and generates one or more haul road design proposals that conform to the haul road definitions. The haul road design parameters 165 may be reported to subscriber 170 for selection and implementation of a haul road design.

Upon implementation and construction of the haul road in accordance with one or more of the designs, a second set of performance data may be collected to monitor greenhouse gas emissions associated with the implemented haul road design (Step 306). In contrast with the first set of performance data, which was collected to generate the haul road design prior to construction, the second set of performance data may be indicative of actual machine operations on the haul road. Consequently, haul road management system 135 may calculate the actual greenhouse gas emission level for each machine based on the second set of performance data (Step 307) and determine whether the actual greenhouse gas emission level is less than the actual greenhouse gas emission limit established by a regulating body (Step 308).

If the actual greenhouse gas emission level is not less than the greenhouse gas emission limit established by regulation (Step 308: No), haul road management system 135 may determine a greenhouse gas emission deficiency (i.e., the amount that the actual greenhouse gas level exceeds the regulation limits) (Step 309). If, on the other hand, the actual greenhouse gas emission level is less than the greenhouse gas emission limit (Step 308: Yes), haul road management system 135 may calculate an amount of greenhouse gas credits generated by the savings in greenhouse gas emissions (Step 310).

Based on the comparison between the actual greenhouse gas emission levels and the emission limit established by any applicable regulations, haul road management system 135 may generate a greenhouse gas emission report 175 for delivery to one or more subscribers 170 (Step 311). In addition to reporting any greenhouse gas emission deficiencies and/or savings, greenhouse gas emission report 175 may include recommendations for reporting greenhouse gas emission balances. Alternatively or additionally, greenhouse gas emission report 175 may include recommendations for acquiring greenhouse gas emission credits to offset any deficiencies between the actual greenhouse gas emission level and any limits established through regulation, in order to avoid possible fines and/or sanctions that may be imposed as a result of such deficiencies.

In addition to providing a solution for generating haul road designs in accordance with greenhouse gas specifications, processes and methods consistent with the disclosed embodiments may also provide solutions for managing an existing haul road based on desired greenhouse gas performance goals associated with the haul road. The method may include receiving performance data associated with at least one machine operating on a haul road (Step 410). The performance data may be received automatically from the at least one machine. For example, an electronic control module or data collection device associated with the at least one machine may be configured to collect machine performance data and automatically stream the machine performance data to condition monitoring system 140. Alternatively or additionally, performance data may be received periodically (e.g., every few minutes, hours, etc.) from each machine in response to a request for performance data generated by condition monitoring system 140.

Based on the received performance data, a greenhouse gas emission level associated with the at least one machine may be determined (Step 420). For example, performance data may include fuel consumption data that may be analyzed to determine an amount of greenhouse gas emissions generated by the at least one machine, based on the engine operating parameters. According to one embodiment, determining a target greenhouse gas emission level may include monitoring an instantaneous greenhouse gas emission level for the at least one machine at a plurality of intervals along the haul road.

Once a greenhouse gas emission level associated with the at least one machine has been determined, the greenhouse gas emission level may be compared with a target greenhouse gas emission level for the at least one machine (Step 430). According to one embodiment, performance simulator 160 may compare the instantaneous greenhouse gas emission level associated with each interval with the target greenhouse gas emission level that has been established for the respective interval. If the greenhouse gas emission level does not exceed the target greenhouse gas emission level (indicating that the at least one machine is operating according to greenhouse gas regulations imposed on the at least one machine) (Step 430: No), haul road management system 135 may calculate the amount of greenhouse gas credits generated by the at least one machine (Step 440).

For example, haul road management system 135 may calculate the amount that the actual greenhouse gas emission level is less than the target greenhouse gas emission level and calculate the number of greenhouse gas credits that may be associated with this amount. Haul road management system 135 may report greenhouse gas credit information to a subscriber 170. According to one exemplary embodiment, haul road management system 135 may automatically prepare an application for validation of greenhouse gas credits based on the calculation and deliver the application to subscriber 170 for submission to an organization that verifies and issues greenhouse gas credits.

If the greenhouse gas emission level exceeds the target greenhouse gas emission level (indicating that the at least one machine is not meeting the imposed greenhouse gas regulations) (Step 430: Yes), performance simulator 160 may simulate machine performance at a plurality of total effective grade values (Step 460). For example, if the instantaneous greenhouse gas emission level for a particular interval exceeds the target greenhouse gas emission level, indicating that a portion of the haul road corresponding to the interval may have a problem that is causing the machines to produce increased levels of greenhouse gas emissions, a location of the haul road corresponding to the interval may be identified and flagged for inspection. Performance simulator 160 may identify and/or select a total effective grade value that, according to the simulated machine performance, limits the greenhouse gas emission level for the machine (Step 470), causing the machine to conform to the target greenhouse gas emission level. Performance simulator 160 may provide recommendations for adjusting a haul road management parameter based on the selected total effective grade value (Step 480). Haul road management parameters may include machine operating parameters (e.g., engine speed, gear, machine payload level, number of engine shifts, etc.) and/or haul road characteristics (e.g., actual grade, various parameters leading to transmission or tire "slip" (e.g., rolling resistance, surface friction, surface density, etc.), haul road maintenance condition, etc.) associated with one or more machines operating in project environment 100.

According to one exemplary embodiment, the presently disclosed haul road management system 135 may be configured to one or more machines that are operating above a target greenhouse gas emission level. Performance simulator 160 of haul road management system 135 may simulate a performance-based software data model corresponding with the identified machine(s) at a plurality of total effective grade values and identify a target total effective grade level that reduces the greenhouse gas emission level for the machine. In order to meet the target total effective grade, performance simulator 160 may recommend a reduction in the machine payload level, thereby reducing the amount of work and, consequently, the amount of fuel that is required to complete a haul road run. This reduction in fuel consumption may result in a corresponding reduction in greenhouse gas emissions.

As an alternative or in addition to reducing the payload level of the machine, performance simulator 160 may recommend adjustment to any haul road management parameter that will reduce the amount of fuel consumed by the machine. For example, in order to reduce greenhouse gas emission, performance simulator 160 may determine, through empirical testing, an ideal engine operating gear and speed that allows the machine to be productive, while limiting fuel consumption. Performance simulator 160 may recommend an engine speed, gear, and payload level that allow the machine to meet such criteria.

As an alternative or in addition to adjusting one or more operational aspects associated with the machine, haul road management system 135 may identify particular portions of the haul road associated with elevated greenhouse gas emission levels. For example, condition monitoring system 140 may monitor real-time fuel consumption and/or greenhouse gas emission data for each machine over each segment of the haul road. Performance simulator 160 may subsequently analyze the particular haul road segment (e.g., by analyzing instantaneous greenhouse gas emission level for a plurality of different haul road segments) that experience elevated or increased levels of greenhouse gas emission. Such portions of the haul road may be flagged for further inspection to ensure that proper operation of the haul road is maintained. For example, if a particular portion of the haul road is associated with an elevated greenhouse gas level, the portion of the haul road may be inspected to ensure that a haul road deficiency (e.g., degradation in the haul road surface causing an increase in slip) is not causing the unnecessary consumption of fuel, which may result in excessive greenhouse gas emissions corresponding with the portion of the haul road.

INDUSTRIAL APPLICABILITY

Methods and systems associated with the disclosed embodiments provide a solution for designing a haul road based on specific user-defined haul road parameters and performance goals. The systems and methods described herein also allow users to test proposed haul road modifications by simulating performance-based machine models to determine the effect of the haul road design on the performance of the machine(s). Project environments that employ the processes and features described herein provide a system that enables subscribers to define haul road parameters and efficiently create haul road designs based on the haul road parameters and actual machine performance data. As a result, each haul road design may be tailored to the specific machine performance goals of the subscriber based on the performance of the specific machines to be operated on the haul road.

Although the disclosed embodiments are described in relation to improving haul road conditions in mine environments, they may be applicable to any environment where it may be advantageous to design a roadway based on performance of the machines to be operated thereon. According to one embodiment, the presently disclosed system and method for improving haul road conditions may be implemented as part of a connected worksite environment that monitors performance data associated with a machine fleet and diagnoses potential problems with machines in the fleet. As a result, systems and methods described herein may provide an integrated system for monitoring performance of one or more machines and designing haul roads based on the performance of the specific machines to be operated on a haul road.

The presently disclosed systems and methods for designing a haul road may have several advantages. For example, the systems and methods described herein provide a solution for automatically generating and testing haul road designs based on performance data associated with one or more specific machines to be operated on the haul road. As a result, the haul road design may be specifically tailored to effectuate efficient greenhouse gas emission performance of the one or more machines to be operated thereon.

In addition, the presently disclosed haul road design system may have significant cost advantages. For example, by simulating performance of one or more machines based on the designed haul road parameters, the presently disclosed system enables users to ensure that the proposed design meets target performance requirements before commencing construction of the haul road, when modifications of the design may significantly increase construction costs and delays.

It will be apparent to those skilled in the art that various modifications and variations can be made to the disclosed systems and methods for haul road management based on greenhouse gas emissions without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for haul road design based on greenhouse gas emissions, the method comprising:
    receiving, using a computer system, a first set of performance data associated with a plurality of machines;
    establishing a greenhouse gas emission limit for the plurality of machines based on the first set of performance data;
    determining a target greenhouse gas emission level for each of the plurality of machines based on the greenhouse gas emission limit;
    determining, using the computer system, a total effective grade based on the target greenhouse gas emission level for a respective machine; and
    generating, using the computer system, a haul road design based on the total effective grade.

2. The method of claim 1, further including:
    collecting a second set of performance data associated with the plurality of machines;
    determining an actual greenhouse gas emission level for the plurality of machines based on the second set of performance data;
    analyzing the actual greenhouse gas emission level for the plurality of machines based on the greenhouse gas emission limit; and
    reporting results of the analysis to a subscriber.

3. The method of claim 2, wherein the first set of performance data includes historical performance data and the second set of performance data includes data gathered during operation of the plurality of machines on a haul road constructed based on the haul road design.

4. The method of claim 3, wherein reporting results of the analysis includes:
    calculating an amount of greenhouse gas credits generated by the plurality of machines if the actual greenhouse gas emission level is less than the greenhouse gas emission limit; and
    generating an application for validation of the amount of greenhouse gas credits.

5. The method of claim 3, wherein reporting results of the analysis includes determining an amount of greenhouse gas credits required by the plurality of machines to conform to the greenhouse gas emission limit if the actual greenhouse gas emission level is not less than the greenhouse gas emission limit.

6. The method of claim 5, further including adjusting at least one of a haul road design parameter and a machine operating parameter if the actual greenhouse gas emission level is not less than the greenhouse gas emission limit.

7. The method of claim 6, wherein the haul road design parameter includes one or more of an actual grade of the haul road, a rolling resistance of the haul road, a surface friction of the haul road, and a surface density of the haul road.

8. The method of claim 6, wherein the machine operating parameter includes one or more of a machine groundspeed, a payload limit, an engine speed, and a fuel consumption rate.

9. The method of claim 1, wherein determining the total effective grade includes simulating, using the computer system, performance of the respective machine to determine the total effective grade resulting in the target greenhouse gas emission level.

10. A method for haul road management based on greenhouse gas emissions, the method comprising:
    receiving, using a computer system, performance data associated with at least one machine operating on a haul road;
    determining a greenhouse gas emission level associated with the at least one machine based on the performance data;
    comparing the greenhouse gas emission level associated with the at least one machine with a greenhouse gas emission limit;
    simulating, using the computer system, performance of the at least one machine at a plurality of total effective grade values if the greenhouse gas emission level is greater than the greenhouse gas emission limit;

selecting a total effective grade value associated with the at least one machine based on the simulated performance; and adjusting, using the computer system, at least one haul road management parameter based on the selected total effective grade value.

11. The method of claim 10, wherein adjusting the at least one haul road management parameter includes adjusting an operating parameter associated with the at least one machine.

12. The method of claim 11, wherein the operating parameter associated with the at least one machine includes one or more of a machine groundspeed, a payload limit, an engine speed, and a fuel consumption rate.

13. The method of claim 10, wherein adjusting the at least one haul road management parameter includes adjusting a rolling resistance associated with the haul road.

14. The method of claim 13, wherein adjusting the rolling resistance associated with the haul road includes adjusting one or more of an actual grade of the haul road, a surface friction of the haul road, and a surface density of the haul road.

15. The method of claim 10, wherein determining the greenhouse gas emission level for the at least one machine includes:
monitoring an instantaneous greenhouse gas emission level for the at least one machine at a plurality of intervals along the haul road;
comparing the instantaneous greenhouse gas emission level associated with each interval with a threshold level for the respective interval;
identifying, if the instantaneous greenhouse gas emission level exceeds a corresponding threshold instantaneous greenhouse gas emission level during an interval, a location of the haul road corresponding to the interval.

16. The method of claim 15, wherein adjusting the at least one haul road management parameter includes adjusting a rolling resistance associated with the identified location of the haul road.

17. The method of claim 10, further including:
determining an amount of greenhouse gas credits generated by the plurality of machines if the greenhouse gas emission level is less than the greenhouse gas emission limit; and
generating a report indicative of the determination of the amount of greenhouse gas credits generated by the plurality of machines.

18. The method of claim 17, further including:
determining an amount of greenhouse gas credits required by the plurality of machines to conform to the greenhouse gas emission limit if the greenhouse gas emission level is not less than the greenhouse gas emission limit; and
generating a report indicative of the determination of the amount of greenhouse gas credits required by the plurality of machines.

19. A computer-readable medium for use on a computer system, the computer-readable medium including computer-executable instructions for performing a method for managing machine payload based on haul road conditions, the method comprising:
receiving performance data associated with at least one machine operating on a haul road;
determining a greenhouse gas emission level for the at least one machine based on the performance data;
comparing the greenhouse gas emission level for the at least one machine with a greenhouse gas emission limit;
simulating performance of the at least one machine at a plurality of total effective grade values if the greenhouse gas emission level is greater than the greenhouse gas emission limit;
selecting a total effective grade value associated with the at least one machine based on the simulated performance; and
adjusting at least one haul road management parameter based on the selected total effective grade value.

20. The computer-readable medium of claim 19, wherein adjusting the at least one haul road management parameter includes adjusting an operating parameter associated with the at least one machine.

21. The computer-readable medium of claim 20, wherein the operating parameter associated with the at least one machine includes one or more of a machine groundspeed, a payload limit, an engine speed, and a fuel consumption rate.

22. The computer-readable medium of claim 19, wherein adjusting the at least one haul road management parameter includes adjusting a rolling resistance associated with the haul road.

23. The computer-readable medium of claim 22, wherein adjusting the rolling resistance associated with the haul road includes adjusting one or more of an actual grade of the haul road, a surface friction of the haul road, and a surface density of the haul road.

24. The computer-readable medium of claim 19, wherein determining the greenhouse gas emission level for the at least one machine includes:
monitoring an instantaneous greenhouse gas emission level for the at least one machine at a plurality of intervals along the haul road;
comparing the instantaneous greenhouse gas emission level associated with each interval with a corresponding threshold instantaneous greenhouse gas emission level for the respective interval;
identifying, if the instantaneous greenhouse gas emission level exceeds a corresponding threshold instantaneous greenhouse gas emission level during an interval, a location of the haul road corresponding to the interval.

25. The computer-readable medium of claim 24, wherein adjusting the at least one haul road management parameter includes adjusting a rolling resistance associated with the identified location of the haul road.

* * * * *